(No Model.) 2 Sheets—Sheet 2.

A. BAUMANN.
ARTIFICIAL STONE BURNING KILN.

No. 267,661. Patented Nov. 21, 1882.

Attests
G. J. Harding
L. J. Maitos

Inventor
Adam Baumann
By his atty

UNITED STATES PATENT OFFICE.

ADAM BAUMANN, OF PHILADELPHIA, PENNSYLVANIA.

ARTIFICIAL-STONE-BURNING KILN.

SPECIFICATION forming part of Letters Patent No. 267,661, dated November 21, 1882.

Application filed May 22, 1882. (No model.)

*To all whom it may concern:*

Be it known that I, ADAM BAUMANN, of the city and county of Philadelphia, and State of Pennsylvania, have invented an Improvement in Artificial-Stone-Burning Kilns, of which the following is a specification.

My invention has reference to kilns particularly adapted to the burning of artificial stone; and it consists in providing said kiln with a number of chambers communicating with each other through the floors, said chambers being arranged one above the other and over the furnace, and the apertures, by means of which the products of combustion pass from one chamber to the next, decrease in area as we ascend in the kiln, and in details of construction, all of which are fully set forth in the following specification, and shown in the accompanying drawings, which form part thereof.

The object of my invention is to provide a suitable kiln in which to burn artificial pumice and whet stones, and by which said substances may be burned without direct contact with the flame or products of combustion, and with the greatest caloric effect from a small consumption of fuel, and, further, to provide means by which the waste heat may be utilized to burn the crude sandstone, to be subsequently used in the manufacture of the artificial stones, to burn the fire-bricks to be used in repairing the kiln, and also to heat the drying-rooms in which the molded artificial stones are arranged to be thoroughly dried before being placed in the kiln.

Although my improved kiln, to be described hereinafter, is particularly adapted to burning artificial pumice-stone and whetstone, it is also well adapted to any substance to be burned, as pottery, or limestone, &c.

Figure 1:
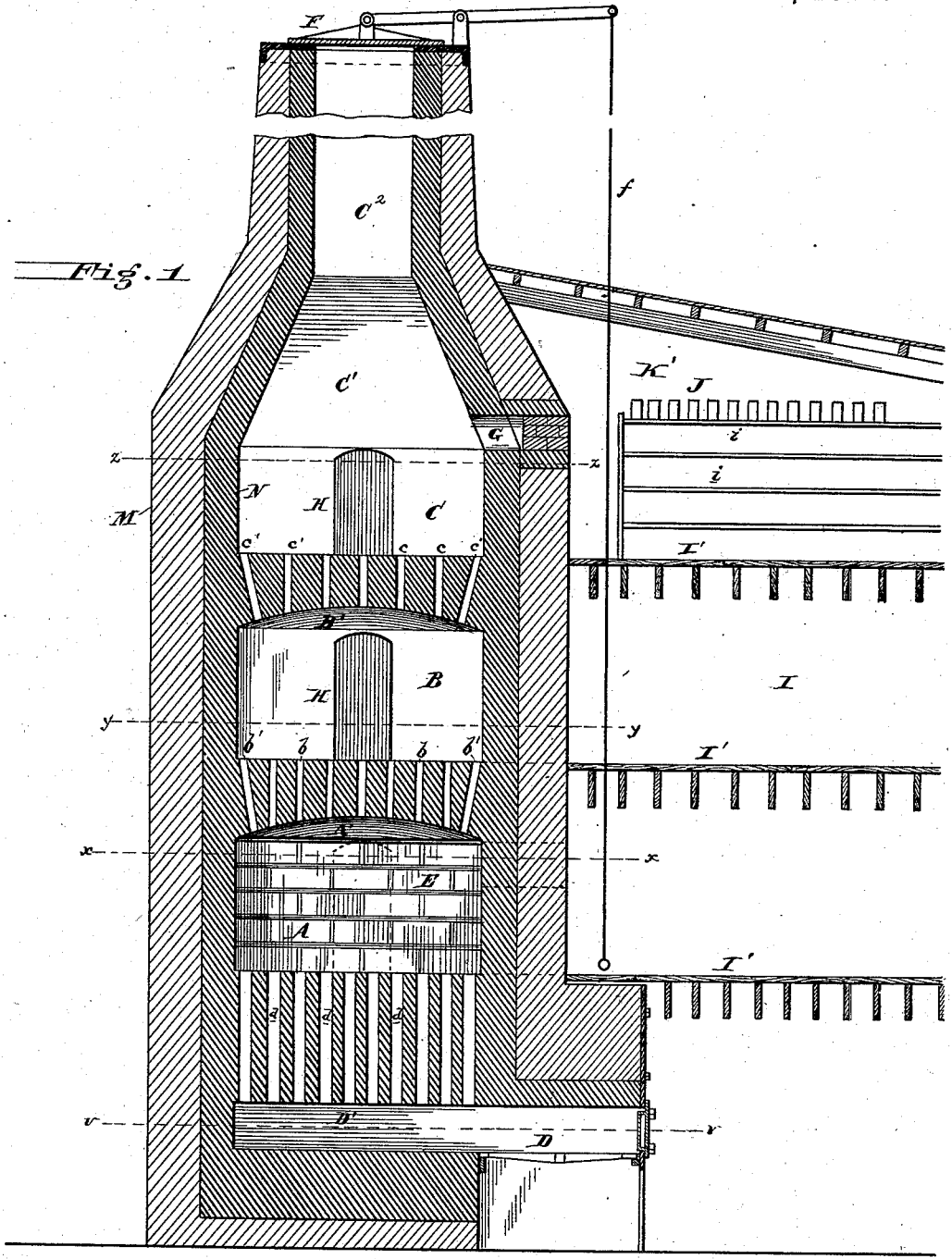
Figure 2:
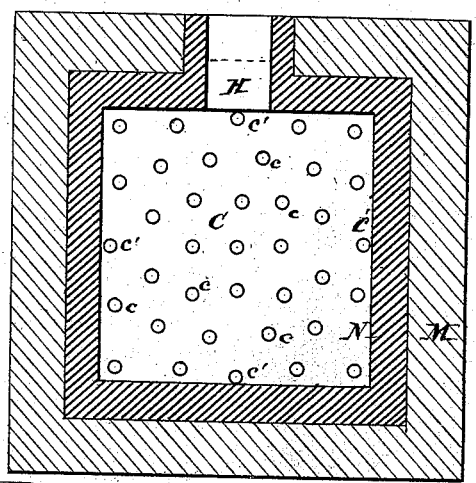
Figure 3:
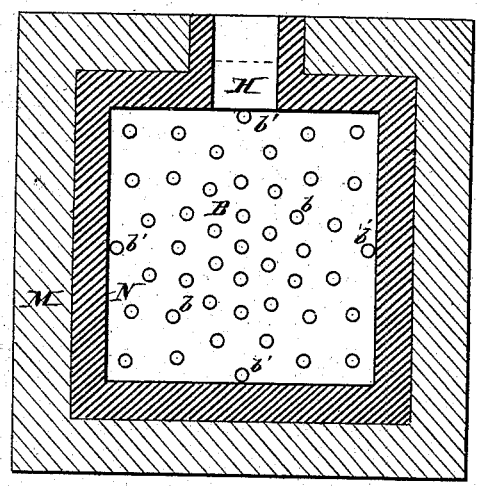
Figure 4:
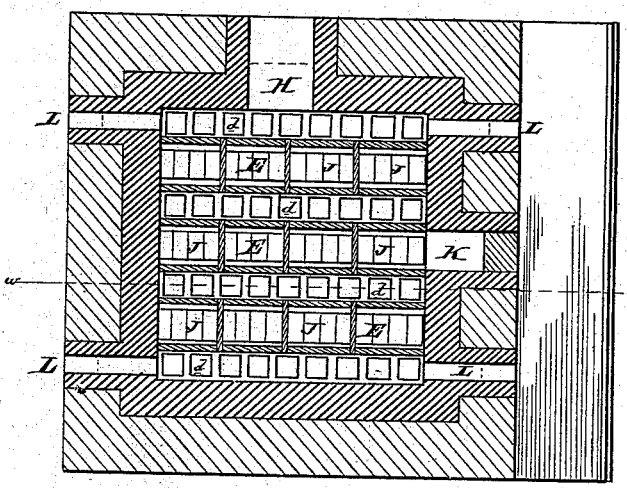
Figure 5:
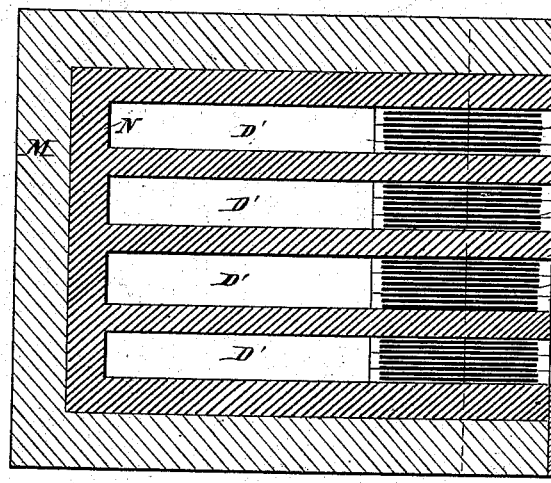

In the drawings, Figure 1 is a sectional elevation of my improved kiln on line *w w*, Fig. 4, and shows its connection with the drying-room. Fig. 2 is a cross-section of same on line *z z*. Fig. 3 is a cross-section of same on line *y y*. Fig. 4 is a cross-section of same on line *x x*, and Fig. 5 is a cross-section of same on line *v v*.

M is the outer or red-brick wall, and N is the interior or fire-brick lining. The kiln is provided with three burning-chambers, A, B, and C, and these are separated from each other by arched roofs or floors A' and B', the chambers being arranged one above the other.

D are the furnaces, which open into flues D', connecting with the chamber A by apertures *d*, which are arranged in rows, as shown in Figs. 1 and 4. Between these apertures or flues *d* in one direction are arranged the tight fire-brick boxes or cellular structures, E, in which the artificial stone J is inclosed, to protect it from the direct action of the products of combustion. If desired, the furnaces D and flues D' may be made into a single furnace and flue, or there may be several furnaces and only one large flue.

The chamber A is provided with sight holes or apertures L, in line with the rows of flues *d*, as shown in Fig. 4, by which the temperature of the interior may be ascertained; and it is also provided with a test or sampling aperture, K, opening into the fire-brick boxes E, by which a sample of the artificial stone may be extracted for examination. This aperture K does not open into the chamber A, so as to communicate in any manner with the products of combustion, and when the kiln is in operation it may be sealed up. The chamber A communicates with chamber B by apertures or flues *b b'*, of less area than the flues *d*, and the latter of said flues, *b'*, are made oblique, so as to convey the products of combustion and heat close up to the walls of chamber B. Chamber B communicates with chamber C by apertures or flues *c c'*, similar to those, *b b'*, just described, only of less area. Chamber C is contracted at the top, as at C', and terminates in the flue or chimney C², provided at the top with a damper, F, actuated by chain or rod *f*. Each of the chambers A, B, and C are provided with charging and discharging doors H, which, when the kiln is in operation, may be sealed up by properly-constructed doors or by brick-work. The floors of chambers A, B, and C are on a level with floors I' of the building I.

K' is the drying-room, and is provided with shelves, upon which the artificial stone J is placed to be dried. This room K' is heated when the kiln is cooling by closing the damper F and opening the aperture G, allowing all of the heat from the kiln to pass into said room. If desired, there may be more than three chambers in the kiln, but for my particular purpose three are sufficient.

From the foregoing description it will be seen that the area of the combined flues $d$ is the greatest, and area of the flues $c$ is the smallest.

In operating, the fire-brick for repairing purposes is placed in chamber C, the crude sandstone, from which to make the artificial stone, is placed in chamber B, and the artificial pumice or whet stone J is inclosed or built within the fire-brick boxes or cellular structures E and excluded from the direct action of the flame. A fire or fires being made in the furnaces D the products of combustion and heat therefrom pass through flues D', up through flues $d$, and between the boxes E, and escape into chamber B by apertures or flues $b\ b'$, when it heats or burns the sandstone, and then through the said chamber, and by flues $c\ c'$ into the chamber C, and, after burning the fire-brick, escapes by chimney $C^2$. The products of combustion have free access to chamber A, but they have not free egress from it. Consequently the greatest thermal effect is produced here where it is most needed. The great concentration of the heat quickly brings the fire-brick walls N and boxes E to red or even a white heat, the heat passing through the walls of said boxes and burning the artificial stone J without glazing its outer surfaces. In addition to there being less area in the combined flues $b\ b'$ than in the flues $d$, the sandstone in chamber B offers an additional obstruction to the passage of said heat from chamber A. By this means the high intensity of heat required to burn the artificial stone is obtained. An additional obstruction is offered to the escape of heat by the still less area of flues $c\ c'$ and the fire-brick arranged above them, yet there is at all times sufficient draft to keep up good combustion. When the heat has been raised to the right point, as seen through eye or sight holes L, and has been maintained there for a sufficient length of time, the aperture K is opened and a sample of the artificial stone J is extracted. If it is sufficiently burned, the fires are drawn or allowed to burn out, the damper F is closed, and the aperture G is opened. The heat now passes into the drying-room K' and dries the molded stones J, arranged on shelves $i$. As soon as the kiln is cool the doors H are opened and the boxes or cellular structures E are broken open and the burned artificial pumice and whet stones removed.

I do not limit myself to the exact construction shown, as it may be modified in many ways without departing from my invention.

Having now described my invention, what I claim as new, and desire to secure by Letters Patent, is—

1. A kiln adapted to burn artificial stone, having two or more compartments or chambers, arranged one above the other, and flues to admit heat to and from said chambers, the flues to admit heat to the lowest chamber having the greatest area, and those to admit heat to the upper chamber having the least area, and exits from the two lower chambers being of different sectional areas, the greater being to the lower chamber, substantially as and for the purpose specified.

2. A kiln for burning artificial stone, having a chamber provided with inlet-flues for heat, arranged in rows, in combination with fire-brick boxes or cellular structures, in which the artificial stone to be burned is placed, arranged between said rows of flues, substantially as and for the purpose specified.

3. A kiln for burning artificial stone, having a chamber provided with inlet-flues for heat, arranged in rows, in combination with boxes or cellular structures made of fire-brick or porous material, arranged between said flues, and in which the artificial stone is placed, and exit-flues from said chamber, the latter being of less area than the inlet-flues, substantially as and for the purpose specified.

4. The combination of furnaces D, flues D' $d$, chamber A, flues $b\ b'$, chamber B, flues $c\ c'$, chamber C, chimney $C^2$, and damper F, substantially as and for the purpose specified.

5. The combination of furnaces D, flues D' $d$, chamber A, flues $b\ b'$, chamber B, flues $c\ c'$, chamber C, having flue G, chimney $C^2$, damper F, and drying-room K', substantially as and for the purpose specified.

6. The combination of furnaces D, flues D' $d$, chamber A, having sight-holes L, and sampling-hole K, roof A', having flues for exit of heat of less area than flues $d$, and fire-brick boxes E, substantially as shown.

7. In a kiln, the chamber B, having inlet-flues $b\ b'$, the latter of which are oblique, substantially as shown and described.

In testimony of which invention I hereunto set my hand.

ADAM BAUMANN.

Witnesses:
R. M. HUNTER,
R. S. CHILD, Jr.